United States Patent
Yamaguchi

(10) Patent No.: US 10,855,828 B2
(45) Date of Patent: Dec. 1, 2020

(54) COMMUNICATION CONTROL DEVICE, COMMUNICATION SYSTEM AND COMMUNICATION METHOD

(75) Inventor: Ryoji Yamaguchi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 238 days.

(21) Appl. No.: 13/248,376

(22) Filed: Sep. 29, 2011

(65) Prior Publication Data

US 2012/0084448 A1 Apr. 5, 2012

(30) Foreign Application Priority Data

Oct. 4, 2010 (JP) .................................. 2010-224750

(51) Int. Cl.
*H04L 29/06* (2006.01)
*H04M 1/67* (2006.01)
(Continued)

(52) U.S. Cl.
CPC ......... *H04M 1/67* (2013.01); *H04M 1/72502* (2013.01); *H04W 12/0802* (2019.01);
(Continued)

(58) Field of Classification Search
CPC .............. H04L 29/06; H04L 29/08576; H04L 29/08072; G06F 2221/2111; G06F 2221/2143
(Continued)

(56) References Cited

U.S. PATENT DOCUMENTS

| 4,893,333 A | 1/1990 | Baran et al. |
| RE34,429 E | 11/1993 | Baran et al. |

(Continued)

FOREIGN PATENT DOCUMENTS

| JP | 02-291767 | 12/1990 |
| JP | 04-196752 | 7/1992 |

(Continued)

OTHER PUBLICATIONS

Notification of Reason for Refusal issued in corresponding Japanese Patent Application No. 2010-224750 dated Jan. 8, 2013.

*Primary Examiner* — Liang Che A Wang
*Assistant Examiner* — Sherman Lin
(74) *Attorney, Agent, or Firm* — Banner & Witcoff, Ltd.

(57) ABSTRACT

A communication control device includes: a device connection unit that is configured to establish connection to a plurality of communication devices; a controller that is configured to control communication between the plurality of communication devices, which is connected to the communication control device by the device connection unit, and a counterpart device via a line; and a memory that is configured to store protection-target information including at least information for communication with the plurality of communication devices connected by the device connection unit. The controller is configured to: register at least one communication device from among communication devices connectable by the device connection unit; determine whether or not the at least one registered communication device is connected by the device connection unit; and when the at least one registered communication device is determined to be connected, permit an output of predefined protection-target information for the connected communication device.

14 Claims, 10 Drawing Sheets

(51) Int. Cl.
  *H04M 1/725* (2006.01)
  *H04W 12/08* (2009.01)
  *H04M 1/2745* (2020.01)
  *H04W 12/12* (2009.01)
(52) U.S. Cl.
  CPC ...... *H04M 1/2745* (2013.01); *H04M 2250/60* (2013.01); *H04W 12/12* (2013.01)
(58) Field of Classification Search
  USPC .................................... 709/227, 223, 224
  See application file for complete search history.

(56) References Cited

U.S. PATENT DOCUMENTS

| | | | | |
|---|---|---|---|---|
| 6,088,802 | A * | 7/2000 | Bialick | G06F 21/34 726/3 |
| 6,282,612 | B1 * | 8/2001 | Sakajiri | G06F 21/79 235/380 |
| 6,675,196 | B1 * | 1/2004 | Kronz | H04L 67/16 709/200 |
| 6,871,222 | B1 * | 3/2005 | Frank | G06F 11/1425 707/E17.01 |
| 7,395,336 | B1 * | 7/2008 | Santharam | H04W 60/06 709/227 |
| 2003/0149874 | A1 * | 8/2003 | Balfanz et al. | 713/168 |
| 2004/0192303 | A1 * | 9/2004 | Puthenkulam | 455/435.1 |
| 2005/0033850 | A1 * | 2/2005 | Kirkland | H04L 29/06027 709/228 |
| 2005/0138356 | A1 * | 6/2005 | Hurwitz | H04L 63/104 713/155 |
| 2006/0179316 | A1 * | 8/2006 | Saar | G06F 21/10 713/176 |
| 2007/0260552 | A1 * | 11/2007 | Bennett | H04L 63/0245 705/59 |
| 2008/0082852 | A1 | 4/2008 | Denpo | |
| 2008/0204802 | A1 | 8/2008 | Tanimoto | |
| 2008/0256190 | A1 * | 10/2008 | Ryan | H04L 12/1831 709/206 |
| 2009/0013073 | A1 * | 1/2009 | Chaskar | H04W 8/005 709/224 |
| 2009/0019152 | A1 * | 1/2009 | Huang | 709/224 |
| 2009/0128346 | A1 * | 5/2009 | Zhao et al. | 340/636.15 |
| 2010/0255890 | A1 * | 10/2010 | Mikkelsen | G06Q 10/06 455/567 |

FOREIGN PATENT DOCUMENTS

| | | |
|---|---|---|
| JP | 2005-094643 | 4/2005 |
| JP | 2006-025216 | 1/2006 |
| JP | 2006-048651 | 2/2006 |
| JP | 2007-158501 A | 6/2007 |
| JP | 2007-251251 A | 9/2007 |
| JP | 2008-048222 A | 2/2008 |
| JP | 2008-092166 | 4/2008 |
| JP | 2008-219075 | 9/2008 |
| JP | 2009-005033 | 1/2009 |

* cited by examiner

FIG. 2C

| NUMBER (14c1) | MAC ADDRESS/CORDLESS HANDSET ID NUMBER (14c2) | CORDLESS HANDSET FLAG (14c3) | MFP FLAG (14c4) | CONNECTION CONFIRMATION FLAG (14c5) |
|---|---|---|---|---|

| CORDLESS HANDSET CONNECTION FLAG | MFP CONNECTION FLAG | LINE CONNECTION FLAG | PROTECTION-TARGET INFORMATION RELATING TO CORDLESS HANDSET | | | PROTECTION-TARGET INFORMATION RELATING TO MFP | | | | | |
|---|---|---|---|---|---|---|---|---|---|---|---|
| | | | CORDLESS HANDSET OUTGOING CALL HISTORY | CORDLESS HANDSET INCOMING CALL HISTORY | CORDLESS HANDSET TELEPHONE DIRECTORY | FAX TRANS-MISSION DATA | FAX RE-CEPTION DATA | FAX TRANS-MISSION HISTORY | FAX RE-CEPTION HISTORY | FAX COMMU-NICATION MANAGEMENT REPORT | MFP TELEPHONE DIRECTORY |
| 1 | 1 | 1 | | O | | | | | O | | |
| 1 | 1 | 0 | | X | | | | | X | | |
| 1 | 0 | 1 | | O | | | | | X | | |
| 1 | 0 | 0 | | X | | | | | O | | |
| 0 | 1 | 1 | | X | | | | | X | | |
| 0 | 1 | 0 | | X | | | | | X | | |
| 0 | 0 | 1 | | X | | | | | X | | |
| 0 | 0 | 0 | | X | | | | | X | | |

14d

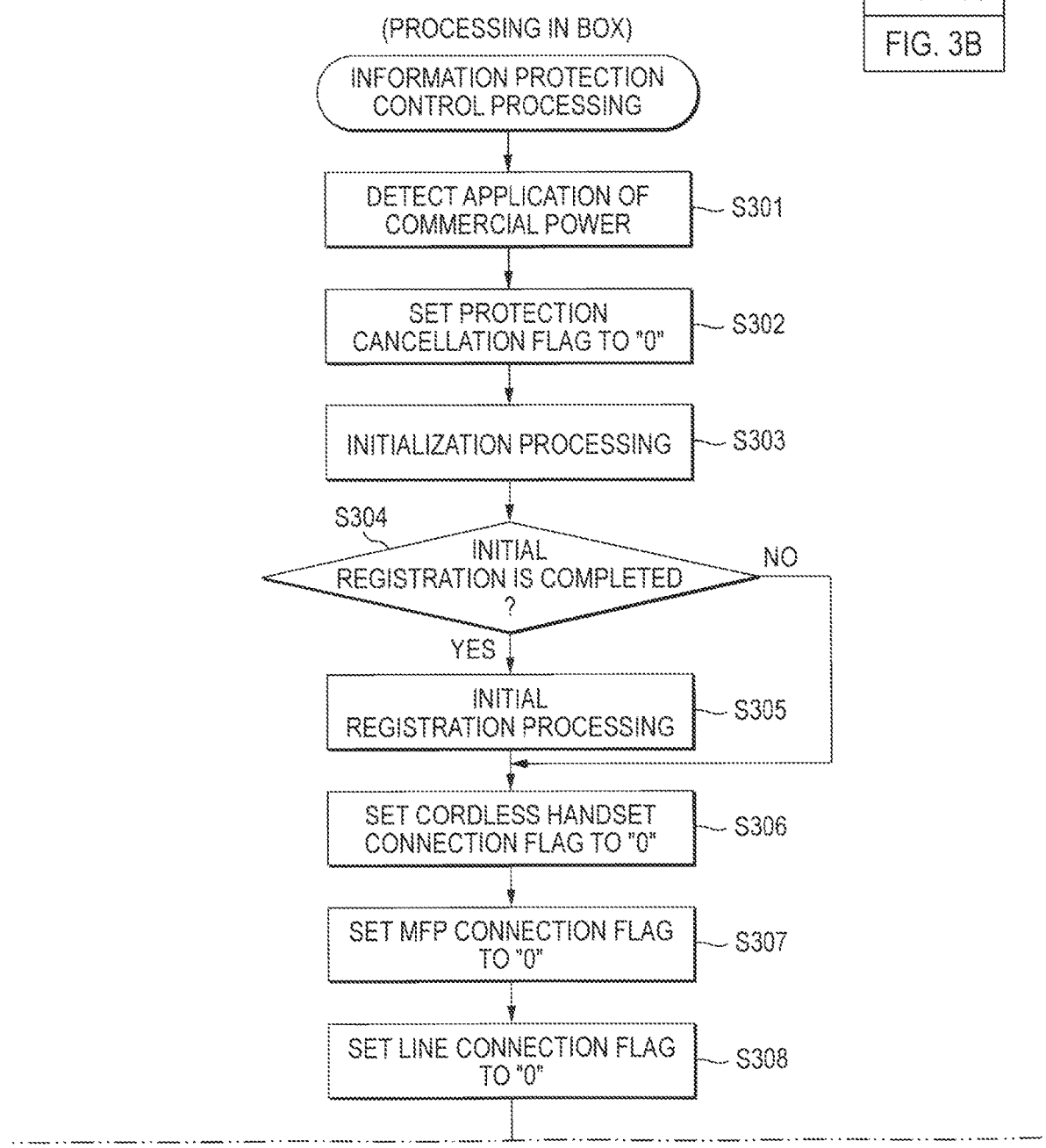

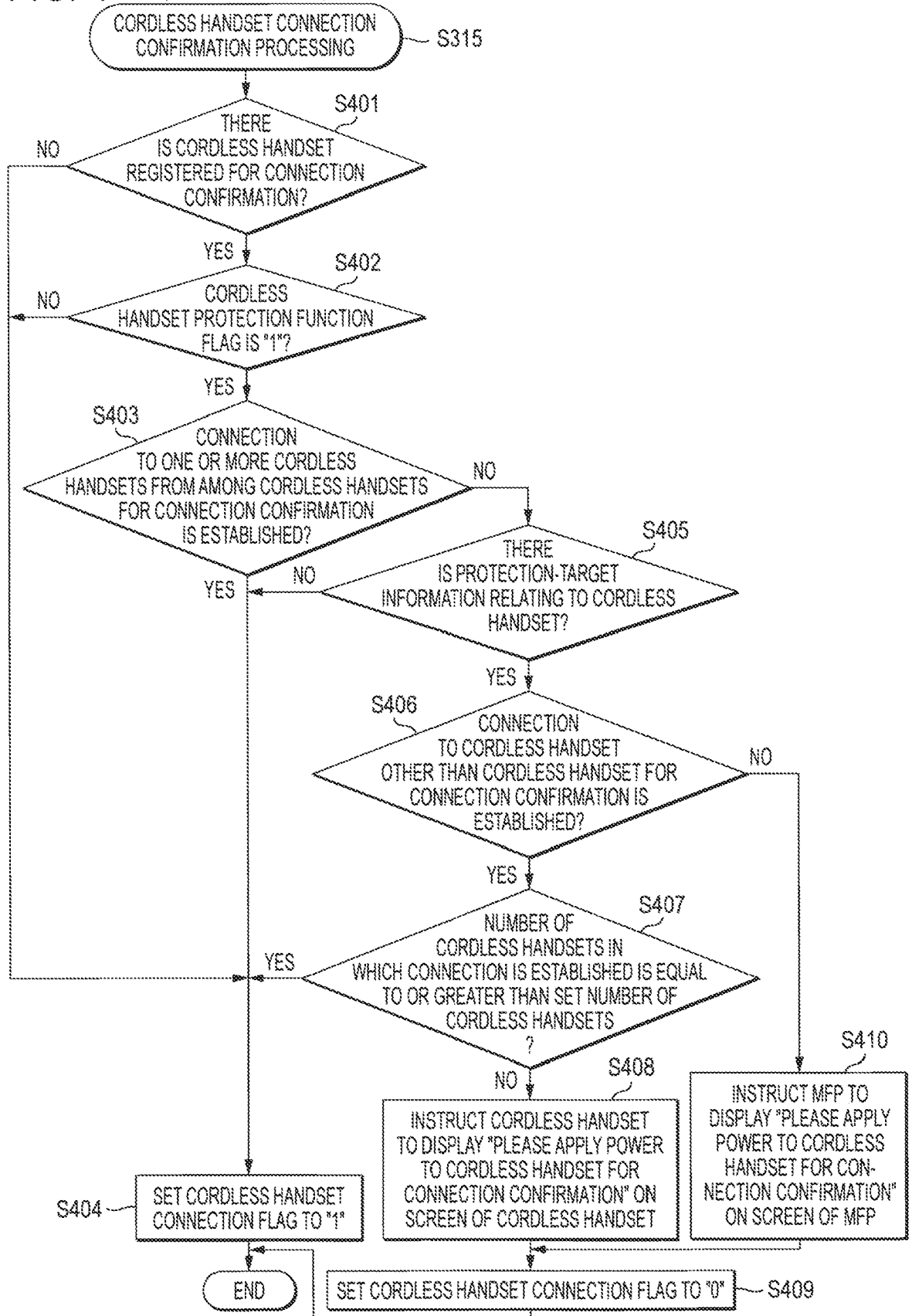

COMMUNICATION CONTROL DEVICE, COMMUNICATION SYSTEM AND COMMUNICATION METHOD

CROSS-REFERENCE TO RELATED APPLICATIONS

This application claims priority from Japanese Patent Application No. 2010-224750 filed on Oct. 4, 2010, the entire subject matter of which is incorporated herein by reference.

TECHNICAL FIELD

The present invention relates to a communication control device, communication system and a communication method.

BACKGROUND

There has been proposed a related-art communication device which can prevent leaking of personal information even when the communication device is stolen, or the like. Specifically, in the related-art communication device, it is assumed that a power shutoff period is long at the time of being stolen, and when commercial power is applied, the personal information is locked if a predetermined period (for example, three minutes) or more elapses since power was last supplied. The personal information is unlocked when a password set in advance is correctly input.

SUMMARY

Illustrative aspects of the invention provide a communication control device and a communication system capable of appropriately protecting information with a reduced burden imposed on a user associated with protection of information.

BRIEF DESCRIPTION OF THE DRAWINGS

FIG. 2C is a schematic view showing contents which are registered in a registration memory, and FIG. 2D is a schematic view illustrating contents which are stored in a lock condition memory;

FIGS. 3A-3B are flowcharts showing information protection control processing;

FIG. 4 is a flowchart showing cordless handset connection confirmation processing;

DETAILED DESCRIPTION

<General Overview>

In the above-described related-art communication device, when locking is carried out with the period since power was shut off as a threshold value, there is a problem in that it is difficult to set the threshold value, and in any case, unnecessary locking is carried out. For example, even when a simple power failure occurs, the period since power was shut off exceeds the threshold value depending on the length of the power failure period, and unnecessary locking is carried out. In a relocation operation in which it is necessary to shut off power over a long period, even when the relocation operation is performed regularly, locking is carried out. With regard to unlocking using a password, if the password is simple, the password is easily cracked. On the other hand, if a complex password is set, there is trouble in remembering the password, or the like, causing inconvenience to a user.

Therefore, illustrative aspects of the invention provide a communication control device and a communication system capable of appropriately protecting information with a reduced burden imposed on a user associated with protection of information.

In order to achieve the object, the present invention provides a communication control device comprising: a device connection unit that is configured to establish connection to a plurality of communication devices; a controller that is configured to control communication between the plurality of communication devices, which is connected to the communication control device by the device connection unit, and a counterpart device via a line; and a memory that is configured to store protection-target information including at least information for communication with the plurality of communication devices connected by the device connection unit, wherein the controller is configured to: register at least one communication device from among communication devices connectable by the device connection unit; determine whether or not the at least one registered communication device is connected by the device connection unit; and when the at least one registered communication device is determined to be connected, permit an output of predefined protection-target information for the connected communication device.

Incidentally, the invention can be configured in various forms of a communication control method, a control program for controlling a communication control device, a recording medium in which the control program is recorded, and the like.

Exemplary Embodiments

Figure 1:
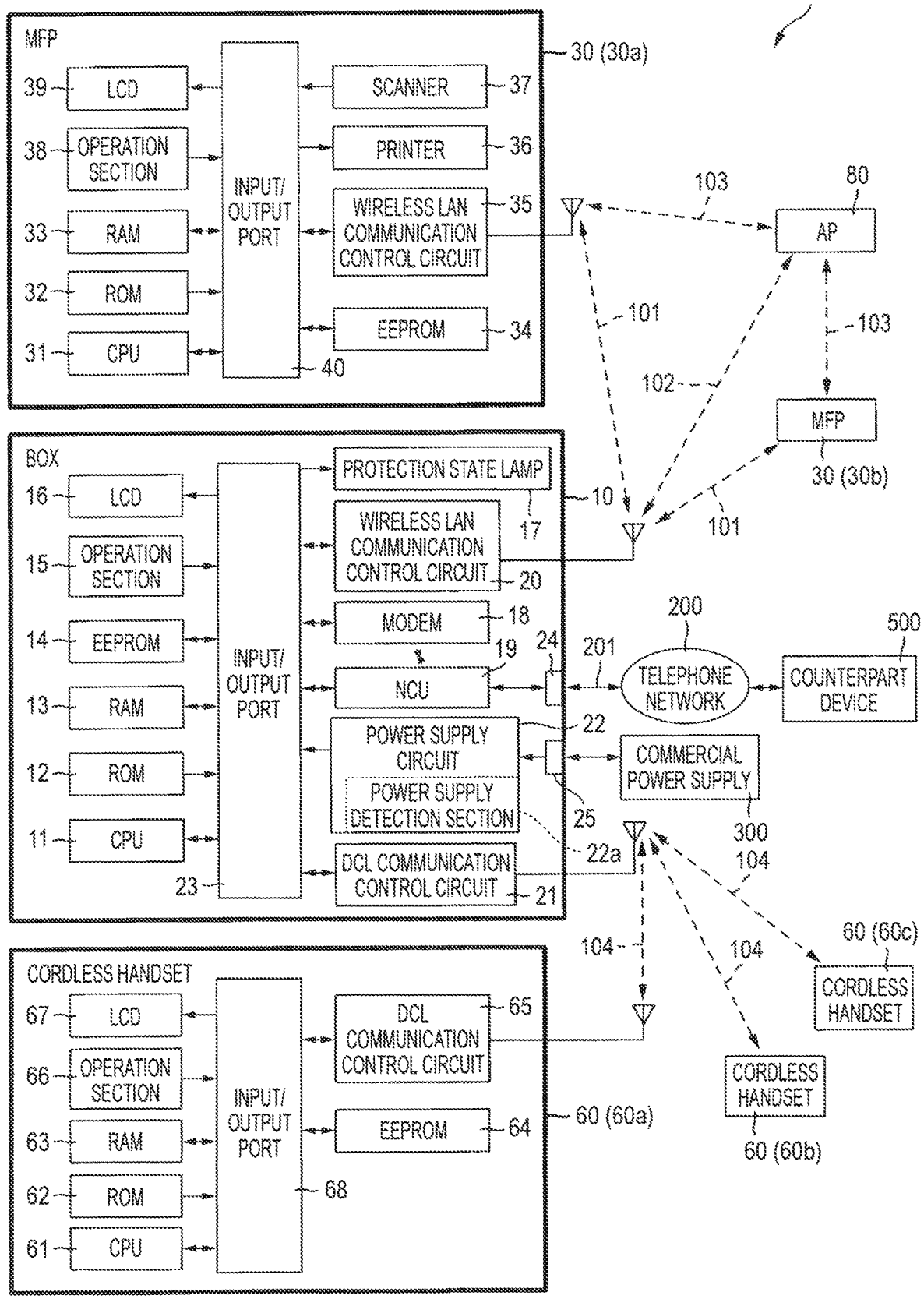
FIG. 1 is a block diagram showing the configuration of a communication system according to an exemplary embodiment of the invention.

Hereinafter, exemplary embodiments of the invention will be described with reference to the accompanying drawings. FIG. 1 is a block diagram showing the configuration of a communication system 1 which is one example of a communication system of the invention. As shown in 1, the communication system 1 includes a line control device (hereinafter, called a "BOX") 10 which is one example of a communication control device of the invention, a multifunction peripheral device (hereinafter, called an "MFP") 30, a cordless handset 60, and an access point (hereinafter, called an "AP") 80. The communication system 1 according to this exemplary embodiment is configured such that a plurality of MFPs 30 and a plurality of cordless handsets 60 are connectable to a single BOX 10. In the example of the communication system 1 shown in FIG. 1, the MFPs 30 include two MFPs 30a and 30b, and the cordless handsets 60 include three cordless handsets 60a to 60c.

The BOX 10 is a communication control device which is driven with power supplied from a commercial power supply 300 to control communication between each MFP 30 or each cordless handset 60 and the counterpart device 500 through a telephone network 200. Although the details will be described later, when the power supply connection section 25 and the commercial power supply 300 are disconnected from each other (that is, power is shut off) or when a line connection section 24 is separated from the telephone network 200, the BOX 10 according to this exemplary embodiment locks protection-target information (information which is protected to prevent leaking of information) stored in a RAM 13 or an EEPROM 14 to inhibit the output of the protection-target information. The locked protection-target information is appropriately unlocked in accordance with the connection situation of the BOX 10 and the MFP 30 or the cordless handset 60 or the connection situation of the BOX 10 and the line 201, thereby permitting the output of the protection-target information.

The MFP 30 has various functions of a printer function, a scanner function, a copy function, a facsimile (FAX) function, and the like. When functioning as a FAX, the MFP 30 performs transmission/reception of facsimile data with respect to the counterpart device 500 through the BOX 10. The cordless handset 60 is a digital cordless telephone which performs communication of voice data or control signals with respect to the counterpart device 500 through the telephone network 200. The AP 80 is a wireless network router having a DHCP (Dynamic Host Configuration Protocol) function.

The BOX 10 has a CPU 11, a ROM 12, a RAM 13, an EEPROM 14, an operation section 15, a liquid crystal display (hereinafter, called an "LCD") 16, a protection state lamp 17, a modem 18, an NCU 19, a wireless LAN communication control circuit 20, a DCL communication control circuit 21, and a power supply circuit 22. These composition elements are connected to each other through an input/output port 23. The BOX 10 has a line connection section 24 and a power supply connection section 25. The line connection section 24 is connected to the NCU 19, and the power supply connection section 25 is connected to the power supply circuit 22.

The CPU 11 controls the respective selections connected to the input/output port 23 in accordance with fixed values or programs stored in the ROM 12 or the like or various signals transmitted and received through wireless communication 101 and 102. The ROM 12 is a non-rewritable memory. The ROM 12 stores programs for carrying out processing described later with reference to FIGS. 3 to 8. The RAM 13 is a rewritable volatile memory, and the contents which are stored therein will be described later with reference to FIG. 2A. The EEPROM 14 is a rewritable nonvolatile memory, and the contents which are stored therein will be described later with reference to FIG. 2B.

The operation section 15 is a key group which performs the respective functions of the BOX 10. The LCD 16 is a screen which displays various kinds of functional information of the BOX 10. The protection state lamp 17 is a lamp which allows a user to visually recognize whether or not protection-target information stored in the RAM 13 or the EEPROM 14 is locked (that is, the output of protection-target information is inhibited) in accordance with the lighting state thereof. Specifically, if the protection state lamp 17 is turned on, this indicates that protection-target information is locked, and if the protection state lamp 17 is not turned on, this indicates that protection-target information is not locked.

The modem 18 modulates FAX transmission data to a signal to be transmitted to the telephone network 200 and transmits the signal through the NCU 19, or receives a signal input from the telephone network 200 through the NCU 19 and demodulates the signal to image data. The NCU 19 connects the BOX 10 and the telephone network 200, and connects or disconnects a line.

The wireless LAN communication control circuit 20 is a circuit which performs wireless communication 101 and 102 using the 2.4 GHz band through an antenna section (not shown) by a wireless LAN based on the IEEE802.11b/g standard. Wireless communication 101 is wireless communication which is performed between the BOX 10 and the MFP 30 in an ad-hoc mode, and wireless communication 102 is wireless communication which is performed between the BOX 10 and the AP 80 when communication is performed between the BOX 10 and the MFP 30 through the AP 80 in an infrastructure mode. That is, the BOX 10 is connected to perform data communication with the MFP 30 directly or indirectly by the wireless LAN communication control circuit 20 and performs transmission/reception of digital signals configuring various kinds of data.

The DCL communication control circuit 21 is a circuit which establishes wireless connection to the cordless handset 60 by digital wireless communication 104 in the 2.4 GHz band. The DCL communication control circuit 21 performs transmission/reception and voice data and various commands through an antenna section (not shown).

The power supply circuit 22 is a circuit which obtains a direct-current voltage for activating the respective sections 11 to 21 of the BOX 10 from an alternating-current voltage (commercial voltage 100 volts to 120 volts) supplied from the commercial power supply 300. The power supply circuit 22 has a power supply detection section 22a. The power supply detection section 22a detects a voltage to detect whether power is supplied from the commercial power supply 300.

The line connection section 24 establishes detachable connection to the line 201 extending from the telephone network 200. The line connection section 24 is, for example, a convex portion (jack), which is provided at the leading end of a cable extending from the casing of the BOX 10 and is insertable into a receptacle provided at the leading end of the line 201, or a receptacle, which is provided to have a concave shape in the casing of the BOX 10 and is insertable into a jack provided at the leading end of a cable extending from the line 201. The line connection section 24 has a line connection detection section (not shown) which monitors a voltage supplied from the line 201 to detect whether or not the line 201 is connected to the line connection section 24. The power supply connection section 25 establishes connection to the commercial power supply 300, and is, for example, a socket plug which is provided at the leading end of a cable extending from the casing of the BOX 10.

Next, the MFP 30 will be described. Although FIG. 1 shows only the configuration of the MFP 30a in the form of a block diagram, another MFP 30 (MFP 30b) has the same configuration. The MFP 30 has a CPU 31, a ROM 32, a RAM 33, an EEPROM 34, a wireless LAN communication control circuit 35, a printer 36, a scanner 37, an operation section 38, and an LCD 39. These composition elements are connected to each other through an input/output port 40.

The CPU 31 controls respective functions or respective sections connected to the input/output port 40 in accordance with fixed values or programs stored in the ROM 32 or the like or various signals transmitted/received through the wireless LAN communication control circuit 35. The ROM 32 is a non-rewritable memory which stores a control program to be executed by the CPU 31, or the like. The RAM 33 is a rewritable volatile memory. The EEPROM 34 is a rewritable nonvolatile memory.

The wireless LAN communication control circuit 35 is the same circuit as the above-described wireless LAN communication control circuit 20. The wireless LAN connection control circuit 35 performs wireless communication 101 and 103 using a 2.4 GHz band through an antenna section (not shown). Wireless communication 101 is wireless communication in the ad-hoc mode as described above, and wireless communication 103 is wireless communication which is performed between the MFP 30 and the AP 80 when communication is performed between the BOX 10 and the MFP 30 through the AP 80 in the infrastructure mode.

With regard to the wireless LAN communication control circuit 35, a unique MAC address is assigned to one wireless LAN communication control circuit 35. That is, one wireless LAN communication control circuit 35 can be specified by the MAC address. Therefore, even when a plurality of MFPs 30 are provided in the communication system 1, each MFP 30 can be identified by the MAC address of the wireless LAN communication control circuit 35 provided in the MFP 30.

The printer 36 performs printing. The scanner 37 performs reading of a document. The operation section 38 is a key group which is used to perform the respective functions of the MFP 30. The LCD 39 is a screen which displays various kinds of functional information of the MFP 30.

Next, the cordless handset 60 will be described. Although FIG. 1 shows only the configuration of the cordless handset 60a in the form of a block diagram, other cordless handsets 60 (cordless handsets 60b and 60c) have the same configuration. The cordless handset 60 has a CPU 61, a ROM 62, a RAM 63, an EEPROM 64, a DCL communication control circuit 65, an operation section 66, and an LCD 67. These composition elements are connected to each other through an input/output port 68.

The CPU 61 controls respective functions or respective sections connected to the input/output port 68 in accordance with fixed values or programs stored in the ROM 62 or the like or various signals transmitted/received through the DCL communication control circuit 65. The ROM 62 is a non-rewritable memory which stores a control program executed by the CPU 61, or the like. The RAM 63 is a rewritable volatile memory. The EEPROM 64 is a rewritable nonvolatile memory.

The DCL communication control circuit 65 is the same circuit as the above-described DCL communication control circuit 21, and performs digital wireless communication 104 in the 2.4 GHz band with the BOX 10 through an antenna section (not shown) to perform transmission/reception of voice data and various commands. A unique cordless handset ID number is assigned to each DCL communication control circuit 65. That is, one DCL communication control circuit 65 can be specified by the cordless handset ID number. Therefore, even when a plurality of cordless handsets 60 are provided in the communication system 1, each cordless handset 60 can be identified by the cordless handset ID number of the DCL communication control circuit 65 mounted in the cordless handset 60.

Figure 2A:
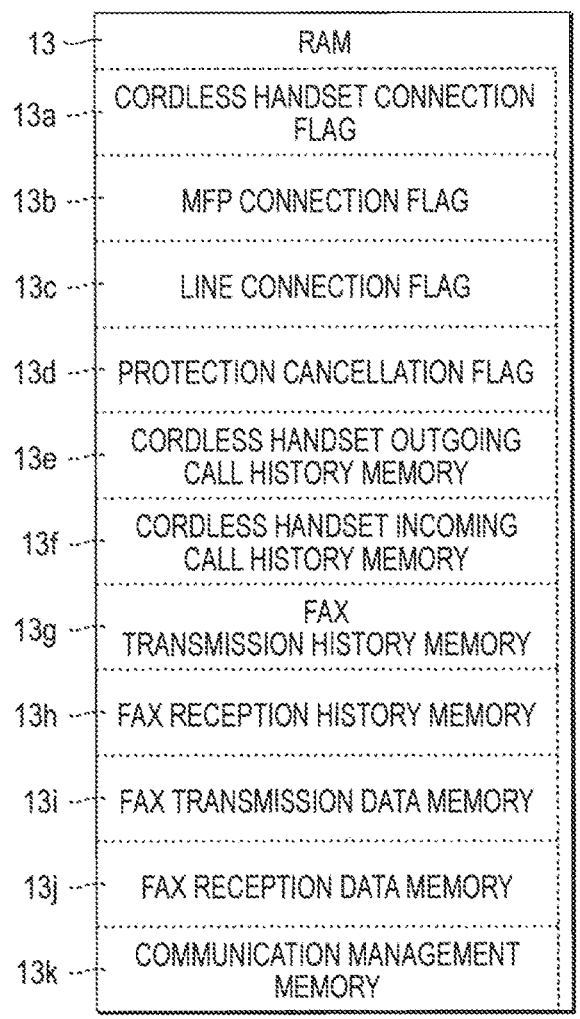
FIG. 2A is a block diagram showing the configuration of a RAM in a BOX.

Next, the contents which are stored in the memory (the RAM 13 or the EEPROM 14) of the BOX 10 will be described with reference to FIGS. 2A to 2D. FIG. 2A is a block diagram showing the configuration of the RAM 13 of the BOX 10.

The RAM 13 has a cordless handset connection flag 13a, an MFP connection flag 13b, a line connection flag 13c, a protection cancellation flag 13d, a cordless handset outgoing call history memory 13e, a cordless handset incoming call history memory 13f, a FAX transmission history memory 13g, a FAX reception history memory 13h, a FAX transmission data memory 13i, a FAX reception data memory 13j, and a communication management memory 13k.

The cordless handset connection flag 13a is a flag which indicates whether or not the connection between any cordless handset 60 and the BOX 10 is established under a predetermined condition. If the power supply detection section 22a detects that power supply from the commercial power supply 300 starts, the cordless handset connection flag 13a is set to "0", and subsequently, when the above-described connection is established, the cordless handset connection flag 13a is set to "1".

The MFP connection flag 13b is a flag which indicates whether or not the connection between any MFP 30 and the BOX 10 is established under a predetermined condition. If the power supply detection section 22a detects that power supply from the commercial power supply 300 starts, the MFP connection flag 13b is set to "0", and subsequently, when the above-described connection is established, the MFP connection flag 13b is set to "1".

The line connection flag 13c is a flag which indicates whether or not the line connection section 24 is connected to the line 201. When the power supply detection section 22a detects that power supply from the commercial power supply 300 starts, or when the line connection detection section of the line connection section 24 detects that the line connection section 24 is not connected to the line 201, the line connection flag 13c is set to "0". On the other hand, when the line connection detection section detects that the line connection section 24 is connected to the line 201, the line connection flag 13c is set to "1".

The protection cancellation flag 13d is a flag which indicates whether or not to unlock protection-target information. When all pieces of protection-target information are unlocked, the protection cancellation flag 13d is set to "1". When protection-target information should be locked, the protection cancellation flag 13d is set to "0".

The cordless handset outgoing call history memory 13e is an area in which, each time the cordless handset 60 makes a call to the counterpart device 500 through the BOX 10, the line number (telephone number) or the like of the counterpart device 500 as a destination is stored as an outgoing call history. The cordless handset incoming call history memory 13f is an area in which, each time the cordless handset 60 receives an incoming call from the counterpart device 500 through the BOX 10, the line number or the like of the counterpart device 500 as a source is stored as an incoming call history. The cordless handset outgoing call history memory 13e and the cordless handset incoming call history memory 13f are provided for each cordless handset 60 in the communication system 1, and respectively store the outgoing call history and the incoming call history of each of the cordless handsets 60a to 60c.

The FAX transmission history memory 13g is an area in which, each time the MFP 30 transmits facsimile data to the counterpart device 500 through the BOX 10, the line number (FAX number) or the like of the counterpart device 500 as a destination is stored as a transmission history. The FAX reception history memory 13h is an area in which, each time the MFP 30 receives facsimile data from the counterpart device 500 through the BOX 10, the line number or the like of the counterpart device 500 as a source is stored as a reception history. The FAX transmission history memory 13g and the FAX reception history memory 13h are provided for each MFP 30 in the communication system 1, and respectively store the transmission history and the reception history of each of the MFPs 30a and 30b. The FAX transmission data memory 13i is an area in which, when facsimile data to be transmitted to the counterpart device 500 is received from the MFP 30, stores facsimile data. The FAX reception data memory 13j is an area which stores facsimile data received from the counterpart device 500. The communication management memory 13k is an area which records information relating to transmission/reception of facsimile data by the MFP 30 through the BOX 10 (the date and time of transmission/reception of facsimile data, the line number of a destination or a source of facsimile data, and the like). The communication management memory 13k is provided for each MFP 30 in the communication system 1.

The contents which are stored in the above-described memories 13e to 13k are treated as "protection-target information" which is protected to prevent leaking of information. The "protection-target information" includes at least information for communication with the MFP 30 or the cordless handset 60, such as the contents which are stored it the memories 13e to 13k, and may include other kinds of information. The BOX 10 controls the inhibition and permission of outputting the contents in the memories 13e to 13k in accordance with the set values of the cordless handset connection flag 13a, the MFP connection flag 13b, and the line connection flag; 13c (details will be described later).

Figure 2B:
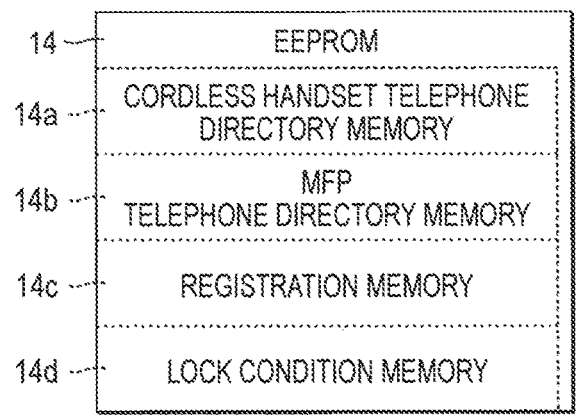
FIG. 2B is a block diagram showing the configuration of an EEPROM in the BOX.

FIG. 2B is a block diagram showing the configuration of the EEPROM 14 of the BOX 10. The EEPROM 14 has a cordless handset telephone directory memory 14a, an MFP telephone directory memory 14b, a registration memory 14c, and a lock condition memory 14d.

The cordless handset telephone directory memory 14a is an area in which the line numbers (telephone numbers) of one or a plurality of counterpart devices 500 registered by the cordless handset 60 are stored as telephone directory data. The cordless handset telephone directory memory 14a is provided for each cordless handset 60 in the communication system 1. The MFP telephone directory memory 14b is an area in which the line numbers (FAX numbers) of one or a plurality of counterpart devices 500 registered by the MFP 30 are stored as telephone directory data. The MFP telephone directory memory 14b is provided for each MFP 30 in the communication system 1. Telephone directory stored in the cordless handset telephone directory memory 14a and the MFP telephone directory memory 14b includes additional information (name, address, images representing opponent parties, and the like) corresponding to the line number in association with the line number of one counterpart device 500. Telephone directory data stored in the memories 14a and 14b is also treated as protection-target information.

The registration memory 14c is an area which registers a communication device MET 30, cordless handset 60) which permits the connection to the BOX 10. Only the MFP 30 and the cordless handset 60 registered into the registration memory 14c are communication devices which can be regularly connected to the BOX 10, and can perform communication with the counterpart device 500 through the BOX 10. The contents which are registered into the registration memory 14c will be described later with reference to FIG. 2C. The lock condition memory 14d is an area which stores the lock conditions of protection-target information, and the details thereof will be described with reference to FIG. 2D.

FIG. 2C is a schematic showing the contents which are registered into the above-described registration memory 14c. The registration memory 14c stores a number (identification number) 14c1, a MAC address/cordless handset ID number 14c2, a cordless handset flag 14c3, an MFP flag 14c4, and a connection confirmation flag 14c5 for each communication device (MFP 30, cordless handset 60). If a predetermined operation is input from the MFP 30 or the cordless handset 60, the MFP 30 or the cordless handset 60 becomes a, registration target, and the contents 14c1 to 14c5 are registered into the registration memory 14c as one kind of registration information relating to the registration target.

The number 14c1 is an internal management number for specifying the MFP 30 or the cordless handset 60 registered in the BOX 10, and a different value is assigned to each communication device from the BOX 10. The MAC address/cordless handset ID number 14c2 is a MAC address or a cordless handset ID number which specifies the registration target received from the MFP 30 or the cordless handset 60 as a registration target. The cordless handset flag 14c3 is a flag which indicates whether or not the registration target is the cordless handset 60. If the registration target is the cordless handset 60, the cordless handset flag 14c3 is set to "1" and if the registration target is not the cordless handset 60, the cordless handset flag 14e3 is set, to "0". The MFP flag 14c4 is a flag which indicates whether or not the registration target is the MFP 30. If the registration target is the MFP 30, the MFP flag 14c4 is set to "1", and if the registration target is not the MFP 30, the MFP flag 14c4 is set to "0".

The connection confirmation flag 14c5 is a flag which indicates whether or not the MFP 30 or the cordless handset 60 as a registration target is regarded as a specific communication device for confirming connection so as to unlock protection-target information. Hereinafter, the specific communication device may be called "cordless handset 60 for connection confirmation" or "MFP 30 for connection confirmation" depending on the type of communication device.

If the registration target is the specific communication device (the cordless handset 60 or MFP 30 for connection confirmation), the connection confirmation flag 14c5 is set to "1". Otherwise, the connection confirmation flag 14c5 is set to "0". The indication on whether or not a communication device as a registration target is regarded as the specific communication device is set by operating the operation section 38 or 66 of the communication device as a registration target (the MFP 30 or the cordless handset 60) or operating the operation section 15 of the BOX 10 at the time of registration. In this exemplary embodiment, when at least one cordless handset 60 is connected to the BOX 10, it is assumed that there is at least one cordless handset 60 for connection confirmation. When at least one MFP 30 is connected, it is assumed that there is at least one MFP 30 for connection confirmation.

FIG. 2D is a schematic view illustrating the contents which are stored in the above-described lock condition memory 14d. The lock condition memory 14d stores flags for lock determination, the set values of the flags, and the lock conditions of protection-target information in association with each other. The contents shown in FIG. 2D are just an example. Protection-target information can be appropriately added or deleted, and the lock conditions can be appropriately set. The contents may be changed by the user.

In this exemplary embodiment, as the flags for lock determination include the cordless handset connection flag 13a, the MFP connection flag 13b, and the line connection flag 13c are provided. In this exemplary embodiment, protection-target information includes the content (cordless handset outgoing call history) of the cordless handset outgoing call history memory 13e, the content (cordless handset incoming call history) of the cordless handset incoming call history memory 13f, the content (cordless handset telephone directory) of the cordless handset telephone directory memory 14a, the content (FAX transmission data) of the FAX transmission data memory 13i, the content (FAX reception data of the FAX reception data memory 13j, the content (FAX transmission history) of the FAX transmission history memory 13g, the content (FAX reception history) of the FAX reception history memory 13h, the content (communication management report) of the communication management memory 13k, and the content (MFP telephone directory) of the MFP telephone directory memory 14b. These kinds of protection-target information are divided into protection-target information (hereinafter, called "protection-target information relating to the cordless handset 60") to be protected on the basis of the connection situation of the BOX 10 and the cordless handset 60 and protection-target information (hereinafter, called "protection-target information relating to the MFP 30") to be protected on the basis of the connection situation of the BOX 10 and the MFP 30. Of the protection-target information, the cordless handset outgoing call history, the cordless handset incoming call history, and the cordless handset telephone directory are divided as the protection-target information relating to the cordless handset 60. The remaining protection-target information (FAX transmission data, FAX reception data, the FAX transmission history, the FAX reception history, the FAX communication management report, and the MFP telephone directory) is divided as the protection-target information relating to the MFP 30.

In FIG. 2D, with regard to the combinations of the set values of the flags 13a to 13c, "x" indicates that protection-target information is locked by a combination of the set values of the flags, and "O" indicates that protection-target information is unlocked by a combination of the set values of the flags. For example, when the set value of the cordless handset connection flag 13a is "1", the set value of the MFP connection flag 13b is "0", and the set value of the line connection flag 13c is "1", the protection-target information (FAX transmission data FAX reception data, the FAX transmission history, the FAX reception history, the FAX communication management report, and the MFP telephone directory) relating to the MFP 30 is locked. On the other hand, the protection-target information (the cordless handset outgoing call history, the cordless handset incoming call history, and the cordless handset telephone directory) relating to the cordless handset 60 is unlocked.

According to the lock condition memory 14d, when the set value of the line connection flag 13c is "0", all pieces of protection-target information (the cordless handset outgoing call history, the cordless handset incoming call history, the cordless handset telephone directory, FAX transmission data, FAX reception data, the FAX transmission history, the FAX reception history, the FAX communication management report, and the MFP telephone directory) are locked regardless of the set values of the cordless handset connection flag 13a and the MFP connection flag 13b. As a form of information leakage, for example, it is assumed that a set of the BOX 10 and the cordless handset 60 or the MFP 30, or a set of the BOX 10, the cordless handset 60, and the MFP 30 is stolen, and only power is applied to each device at another place (each device is connected to the commercial power supply 300) to steal information. However, in a situation in which the line 201 is not connected to the line connection section 24, the line connection flag 13c is set to "0", and all pieces of protection-target information are locked, thereby eliminating stealing of protection-target information.

According to the lock condition memory 14d, even when the set value of the line connection flag 13c is "1", if the value of the cordless handset connection flag 13a is "0", the protection-target information (the cordless handset outgoing call history, the cordless handset incoming call history, and the cordless handset telephone directory) relating to the cordless handset 60 is locked. When the set value of the line connection flag 13c is "1", and the value of the cordless handset connection flag 13a is "1", the protection-target information relating to the cordless handset 60 is unlocked. On the other hand, even when the set value of the line connection flag 13c is "1", if the value of the MFP connection flag 13b is "0", the protection-target information (FAX transmission data, FAX reception data, the FAX transmission history, the FAX reception history, the FAX communication management report, and the MFP telephone directory) relating to the MFP 30 is locked.

As described above, in the BOX 10 according to this exemplary embodiment, even when the line 201 is connected to the line connection section 24, various kinds of information relating to communication between the cordless handset 60 and the counterpart device 500 are locked or unlocked in accordance with the set value of the cordless handset connection flag 13a (the connection situation of the cordless handset 60 and the BOX 10). Similarly, even when the line 201 is connected to the line connection section 24, various kinds of information relating to communication between the MFP 30 and the counterpart device 500 are locked or unlocked in accordance with the set value of the MFP connection flag 13b (that is, the connection situation of the MFP 30 and the BOX 10). Therefore, it is possible to appropriately protect protection-target information based on the type of the communication device (the MFP 30 or the cordless handset 60) in accordance with the connection situation of the communication device and the BOX 10.

As a result of the above-described lock conditions, when all the set values of the flags 13a to 13c are "0", all pieces of protection-target information are locked. When all the set values of the flags 13a to 13c are "1", all pieces of protection-target information are unlocked.

Figure 3B:
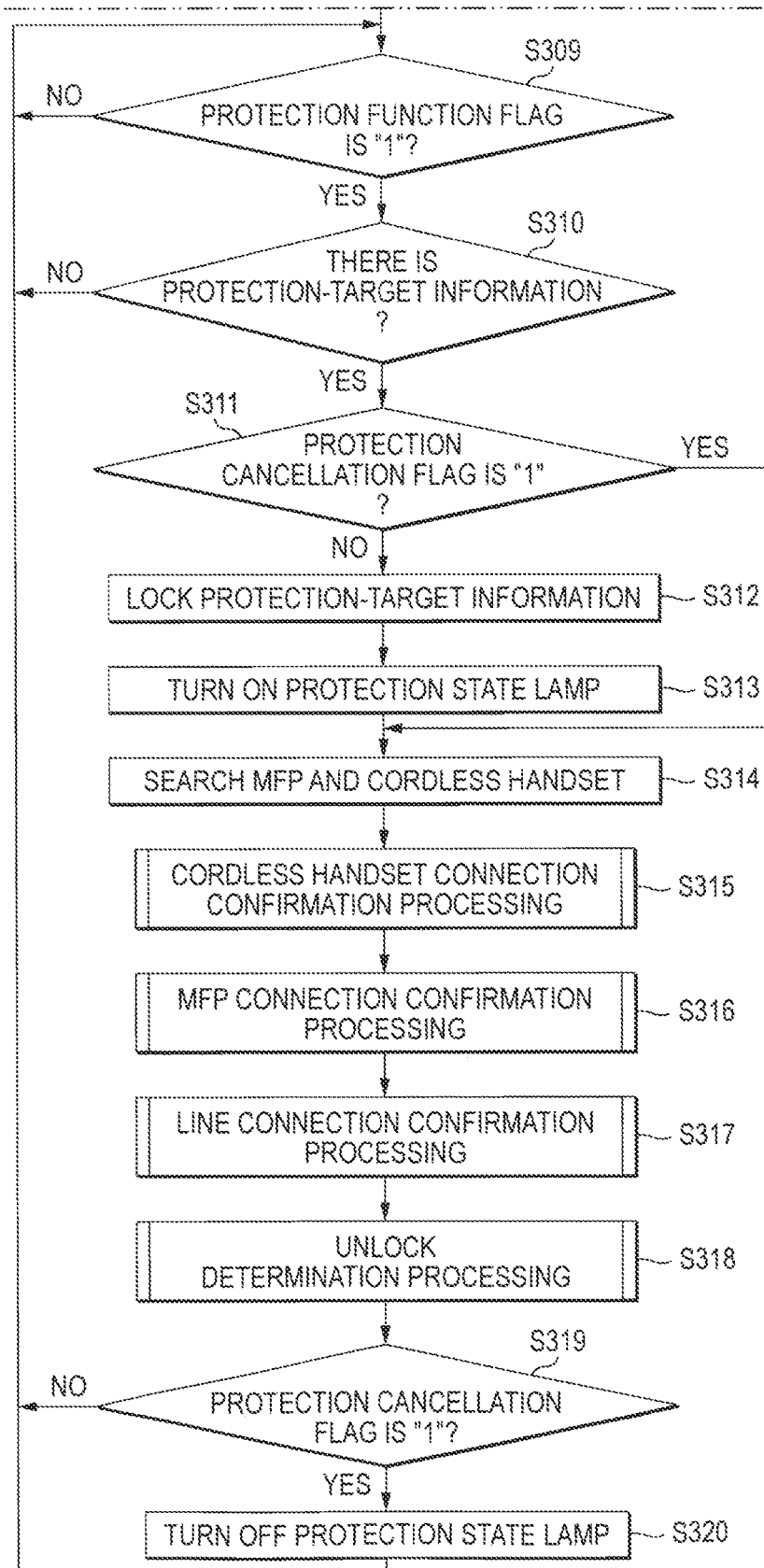

FIG. 3 is a flowchart showing information protection control processing which is performed by the CPU 11 of the BOX 10. The information protection control processing is processing for locking protection-target information when the power supply connection section 25 and the commercial power supply 300 are disconnected from each other or when the line 201 is disengaged from the line connection section 24 and disconnected from the telephone network 200 and subsequently unlocking protection-target information depending on the connection situation of the BOX 10 and the MFP 30 or the cordless handset 60 or the connection situation of the line 201.

The information protection control processing is activated if the power supply connection section 25 and the commercial power supply 300 are connected to each other and power is supplied from a state where the BOX 10 does not obtain power from the commercial power supply 300. The CPU 11 detects the application of power of the commercial power supply 300 by the power supply detection section 22a (S301), and sets the protection cancellation flag 13d to "0" to initialize the protection cancellation flag 13d (S302). Next, the CPU 11 performs initialization processing associated with the power application (S303) and determines whether or not the BOX 10 completes initial registration (S304). When the determination in S304 is negative (S304: No), the CPU 11 performs the initial registration of the BOX 10 (S305), and progresses the processing to S306. With the processing of S305, at least one MFP 30 or cordless handset 60 is registered into the BOX 10. When the determination in S304 is positive (S304: Yes), the CPU 11 progresses the processing to S306.

In S306, the CPU 11 sets the cordless handset connection flag 13a to "0" (S306). Next, the CPU 11 sets the MFP connection flag 13b to "0" (S307), and sets the line connection flag 13c to "0" (S308). After the processing of S308, the CPU 11 determines whether or not a protection function flag (not shown) provided in the RAM 13 is set to "1" (S309). The protection function flag is a flag which indicates whether or not to protect the protection-target information stored in the RAM 13 or the EEPROM 14. When it is determined to protect the protection-target information, the protection function flag is set to "1", and when it is determined not to protect the protection-target information, the protection function flag is set to "0". The user appropriately operates the operation section 15 of the BOX 10 to set the determination on whether or not to protect protection-target information.

When the determination in S309 is positive (S309: Yes), the CPU 11 determines whether or not any protection-target information is stored in the RAM 13 or the EEPROM 14 (S310). If the determination in S310 is positive (S310: Yes), the CPU 11 determines whether or not the protection cancellation flag 13d is "1" (S311). When the determination in S311 is negative (S311: No), the protection-target information is locked on the basis of the content of the lock condition memory 14d in accordance with the set values of the cordless handset connection flag 13a, the MFP connection flag 13b, and the line connection flag 13c (S312). In S301, when power supply starts or restarts from a state where power is not supplied from the commercial power supply 300, since all the flags 13a to 13c are set to "0", in S312, all pieces of protection-target information are locked. Therefore, when the power supply connection section 25 is removed from the commercial power supply 300, for example, at the time of being stolen, all pieces of protection-target information are locked, thereby preventing protection-target information. After the processing in S312, the CPU 11 turns on the protection state lamp 17 (S313), and progresses the processing to S314. When the determination in S311 is positive (S311: Yes), the CPU 11 progresses the processing to S314.

In S314, the CPU 11 searches the MFP 30 and the cordless handset 60 connected to the BOX 10 (S314). Specifically, a broadcast packet which instructs to return a MAC address is sent to each MFP 30 through the AP 80, and search is based on the MAC address returned from the MFP 30 having received the broadcast packet. A command which instructs to return a cordless handset ID number is transmitted to each cordless handset 60, and search is based on the cordless handset ID number returned from the cordless handset 60 having received the command.

Next, the CPU 11 performs cordless handset connection confirmation processing for confirming the connection situation of the cordless handset 60 on the basis of the cordless handset ID number returned from the cordless handset 60 and setting the cordless handset connection flag 13a depending on the connection situation (S315). Next, MFP connection confirmation processing is performed for confirming the connection situation of the MFP 30 on the basis of the MAC address returned from the MFP 30 and setting the MFP connection flag 13b depending on the connection situation (S316). The details of the cordless handset connection confirmation processing (S315) and the MFP connection confirmation processing (S316) will be respectively described later with reference to FIGS. 4 and 5. Next, the CPU 11 performs line connection confirmation processing for confirming the connection situation of the line connection section 24 and the line 201 and setting the line connection flag 13c depending on the connection situation (S317). The details of the line connection confirmation processing (S317) will be described later with reference to FIG. 6.

Next, the CPU 11 performs unlock determination processing for determining whether or not to unlock protection-target information on the basis of the set values of the flags 13a to 13c set by the processing of S315 to S317 (S318). In an unlock determination processing of S318, when all pieces of protection-target information are unlocked, the protection cancellation flag 13d is set to "1" (details of the unlock determination processing (S318) will be described later with reference to FIG. 7).

After the unlock determination processing is performed (S318), the CPU 11 determines whether or not the protection cancellation flag 13d is "1" (S319). When the determination is positive (S319: Yes), the CPU 11 turns off the protection state lamp (S320), and progresses the processing to S309. The processing of S320 also includes the continuation of the turned-off state. On the other hand, when the determination in S319 is negative (S319: No), the CPU 11 progresses the processing to S309.

When the determination in S309 is negative (the information protection function is not used) (S309: No) or when the determination in S310 is negative (there is no protection-target information) (S310: No), the CPU 11 progresses the processing to S309.

FIG. 4 is a flowchart showing the above-described cordless handset connection confirmation processing (S315). In the cordless handset connection confirmation processing, first, the CPU 11 determines whether or not there is one or more cordless handsets 60 registered for connection confirmation (S401). The determination is performed with reference to the registration information stored in the registration memory 14c, and the determination is positive when there is registration information in which the set value of the cordless handset flag 14c3 is "1" and the set value of the connection confirmation flag 14c5 is "1".

When the determination in S401 is positive (S401: Yes), the CPU 11 determines whether or not a cordless handset protection function flag (not shown) provided in the RAM 13 is set to "1" (S402). The cordless handset protection function flag is a flag which indicates whether or not to protect the protection-target information (in this exemplary embodiment, the cordless handset outgoing call history the cordless handset incoming call history, and the cordless handset telephone directory) relating to the cordless handset 60 from among protection-target information. When it is determined to protect the protection-target information, the cordless handset protection function flag is set to "1". When it is determined not to protect the protection-target information, the cordless handset protection function flag is set to "0". The user appropriately operates the operation section 15 of the BOX 10 to set the determination on whether or not to protect the protection-target information relating to the cordless handset 60.

When the determination in S402 is positive (S402: Yes), the CPU 11 determines Whether or not the connection to one or more cordless handsets 60 from among the cordless handsets 60 registered for connection confirmation is established (S403). The determination is performed with reference to the registration information stored in the registration memory 14c, and the determination is positive when there is a coincident MAC address/cordless handset ID number 14c2 by comparing the MAC address/cordless handset ID number of 14c2 registration information, in which the set value of the cordless handset flag 14c3 is "1" and the set value of the connection confirmation flag 14c5 is "1", with the cordless handset ID number returned from the cordless handset 60 as a result of the processing of S314. When the determination in S403 is positive (S403: Yes), the CPU 11 sets the cordless handset connection flag 13a to "1" (S404), and ends the cordless handset connection confirmation processing. If the cordless handset connection flag 13a is set to "1", in the unlock determination processing (S318) described later, the protection-target information relating to the cordless handset 60 is unlocked.

On the other hand, when the determination in S403 is negative, that is, when the connection to one cordless handset 60 for connection confirmation cannot be established (S403: No), the CPU 11 determines whether or not any protection-target information relating to the cordless handset 60 is stored (S405). When the determination is positive (S405: Yes), the CPU 11 determines whether or not the connection to the cordless handset 60 other than the cordless handset for connection confirmation is established (S406). The determination is performed with reference to the registration information stored in the registration memory 14c, and the determination is positive when there is a coincident MAC address/cordless handset number 14c2 by comparing the MAC address/cordless handset ID number 14c2 of registration information, in which the set value of the cordless handset flag 14c3 is "1" and the set value of the connection confirmation flag 14c5 is "0", with the cordless handset ID number returned from the cordless handset 60 as a result of the processing of S314.

When the determination in S406 is positive (S406: Yes), the CPU 11 determines whether or not the number of cordless handsets 60, in which the connection is established, from among the cordless handsets 60 other than the cordless handset for connection confirmation is equal to or greater than a predefined number (for example, 3) of cordless handsets (S407). When the determination is positive (S407: Yes), the CPU 11 progresses the processing to S404.

When the determination in S406 is negative (S406: No), the CPU 11 instructs the MFP 30 to display "Please apply power to a cordless handset for connection confirmation" on the screen of the MFP 30 (S410). The instruction is made by transmitting a broadcast packet from the wireless LAN communication control circuit 20 to each MFP 30 through the AP 80. As a result of the processing of S410, if the MFP 30 to which power is applied at that time receives the broadcast packet, the message is displayed on the LCD 39 of the MFP 30. If the user views the messages displayed on the LCD 39 of the MFP 30 and applies power to the cordless handset 60 for connection confirmation, the determination in S403 which will be subsequently performed is to be positive.

When the determination in S407 is negative (S407: No), the CPU 11 instructs the cordless handset 60 to display "Please apply to a cordless handset for connection determination" on the screen of the cordless handset 60 (S408). The instruction is made by the transmission of the command from the DCL communication control circuit 21. As a result of the processing of S408, if the cordless handset 60 to which power is applied at that time receives the command, the message s displayed on the LCD 67 of the cordless handset 60. If the user views the message displayed on the LCD 67 of the cordless handset 60 and applies power to the cordless handset 60 for connection confirmation, the determination in S403 which will be subsequently performed is to be positive. Since there are many cases where power is constantly applied to the cordless handset 60 for purpose, the cordless handset 60 easily receives the instruction in the processing of S408, and the transmission probability to the user is high.

After the processing of S408, the CPU 11 sets the cordless handset connection flag 13a to "0" (S409), and ends the cordless handset connection confirmation processing. If the cordless handset connection flag 13a is set to "0", in the unlock determination processing (S318) described later, the protection cancellation flag 13d is set to "0". Thus, in the next processing cycle of the information protection control processing, the processing of S312 is performed, and the protection-target information relating to the cordless handset 60 is locked.

When the determination in S401 is negative (when no cordless handset 60 is registered in the BOX 10) (S401: No), when the determination in S402 is negative (when it is determined not to protect the protection-target information relating to the cordless handset 60) (S402: No), or when the determination in S405 is negative (when no protection-target information relating to the cordless handset 60 is stored) (S405: No), the CPU 11 progresses the processing to S404.

Accordingly, according to the cordless handset connection confirmation processing, if the connection to at least one of the cordless handsets 60 registered in advance for connection confirmation is established, the cordless handset connection flag 13a is set to "1". Even when the connection to the cordless handset 60 for connection confirmation cannot be established, if the connection to a predetermined number or more of other cordless handsets 60 is established, the cordless handset connection flag 13a is set to "1". Therefore, even when power supply to the cordless handset 60 for connection confirmation is shut off, the cordless handset connection flag 13a can be set to "1", making it possible to suppress wasteful continuous inhibition of outputting the protection-target information relating to the cordless handset 60.

Figure 5:
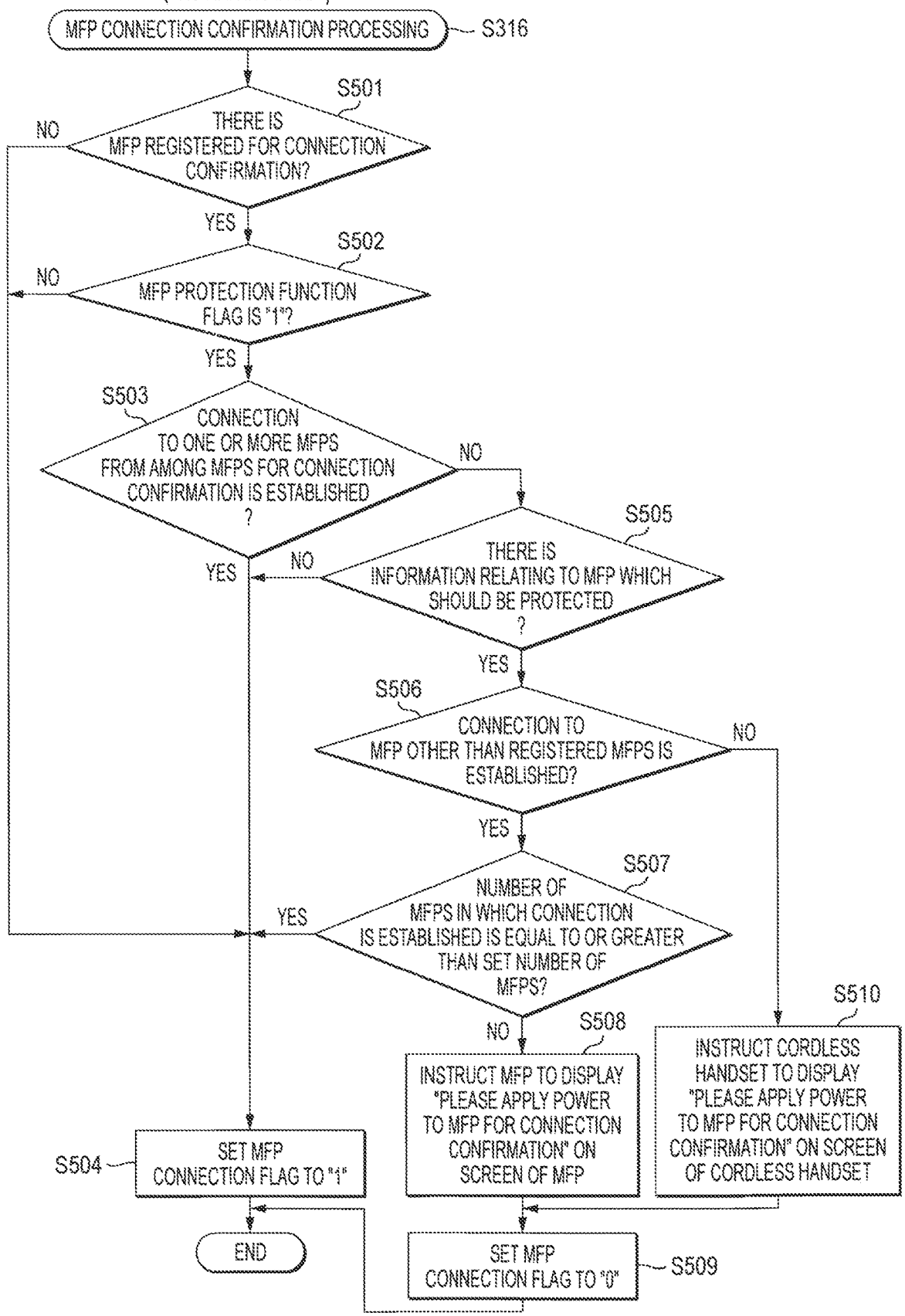
FIG. 5 is a flowchart showing MFP connection confirmation processing.

FIG. 5 is a flowchart showing the above-described MFP connection confirmation processing (S316). In the MFP connection confirmation processing, first, the CPU 11 determines whether or not there is the MFP 30 registered for connection confirmation (S501). The determination is performed with reference to the registration information stored in the registration memory 14c, and the determination is positive when there is registration information in which the set value of the MFP flag 14c4 is "1" and the set value of the connection confirmation flag 14c5 is "1".

When the determination in S501 is positive (S501: Yes), the CPU 11 determines whether or not an MFP protection function flag (not shown) provided in the RAM 13 is set to "1" (S502). The MFP protection function flag is a flag which indicates whether or not to protect the protection-target information (in this exemplary embodiment, FAX transmission data, FAX reception data, the FAX transmission history, the FAX reception history, the FAX communication management report, and the MFP telephone directory) relating to the MFP 30 from among protection-target information. When it is determined to protect the protection-target information, the MFP protection function flag is set to "1" and when it is determined not to protect the protection-target information, the MFP protection function flag is set to "0". The user appropriately operates the operation section 15 of the BOX 10 to set the determination on whether or not to protect the protection-target information relating to the MFP 30.

When the determination in S502 is positive (S502: Yes), the CPU 11 determines whether or not the connection to one or more MFPs 30 from among the MFPs 30 registered for connection confirmation is established (S503). The determination is performed with reference to the registration information stored in the registration memory 14c, and the determination is positive when there is a coincident MAC address/cordless handset ID number 14c2 by comparing the MAC address/cordless handset IL) number 14c2 of registration information, in which the set value of the MFP flag 14c4 is "1" and the set value of the connection confirmation flag 14c5 is "1", with the MAC address returned from the MFP 30 as a result of the processing of S314. When the determination in S503 is positive (S503: Yes), the CPU 11 sets the MFP connection flag 13b to "1" (S504), and ends the MFP connection confirmation processing. If the MFP connection flag 13b is set to "1", in the unlock determination processing (S318) described later, the protection-target information relating to the MFP 30 is unlocked.

On the other hand, when the determination in S503 is negative (S503: No), the CPU 11 determines whether or not any protection-target information relating to the MFP 30 is stored (S505). When the determination is positive (S505: Yes), the CPU 11 determines whether or not the connection to the MFP 30 other than the MFP 30 for connection confirmation is established (S506). The determination is performed with reference to the registration information stored in the registration memory 14c, and the determination is positive when there is a coincident MAC address/cordless handset ID number 14c2 by comparing the MAC address/ cordless handset ID number 14c2, of registration information, in which the set value of the MFP flag 14c4 is "1" and the set value of the connection confirmation flag 14c5 is "0", with the MAC address returned from the MFP 30 as a result of the processing of S314.

When the determination in S506 is positive (S506: Yes), the CPU 11 determines whether or not the number of MFPs 30, in which the connection is established, from among the MFPs 30 other than the MFP for connection confirmation is equal to or greater than a predefined number (for example, 2) of MFPs (S507). When the determination is positive (S507: Yes), the CPU 11 progresses the processing to S504.

On the other hand, when the determination in S506 is negative (S506: No), the CPU 11 instructs the cordless handset 60 to display "Please apply power to the MFP for connection confirmation" on the screen of the cordless handset 60 (S510), The instruction is performed in the same manner as the processing of S408. Since there are many cases where power is constantly applied to the cordless handset 60 for purpose, with the output of the screen display instruction to the cordless handset 60, it is possible to increase the transmission probability to the user, making it easy for the user to take an appropriate measure (for example, the application of power to the MFP 30 for connection confirmation).

When the determination in S507 is negative (S507: No), the CPU 11 instructs the MFP 30 to display "Please apply power to the MFP for connection confirmation" on the screen of the MFP 30 (S508). The instruction is made by transmitting a broadcast packet from the wireless LAN communication control circuit 20 to each MFP 30 through the AP 80. As a result of the processing of S508, if the MFP 30 to which power is applied at that time receives the broadcast packet, the message is displayed on the LCD 39 of the MFP 30. If the user views the message displayed on the LCD 39 of the MFP 30 and applies power to the MFP 30 for connection confirmation, the determination in S503 which will be subsequently performed is positive.

After the processing of S508 or S510, the CPU 11 sets the MFP connection flag 13b to "0" (S509), and ends the MFP connection confirmation processing. If the MFP connection flag 13b is set to "0", in the unlock determination processing (S318) described later, the protection cancellation flag 13d is set to "0". Thus, in the next processing cycle of the information protection control processing, the processing of S312 is performed, and the protection-target information relating to the MFP 30 is locked. When the determination in S501 is negative (when no MFP 30 is registered in the BOX 10) (S501: No), when the determination in S502 is negative (when it is determined not to protect the protection-target information relating to the MFP 30) (S502: No), or when the determination in S505 is negative (when no protection-target information relating to the MFP 30 is stored) (S505: No), the CPU 11 progresses the processing to S504.

Accordingly, according to the MFP connection confirmation processing, if the connection to at least one of the MFPs 30 registered for connection confirmation is established, the MFP connection flag 13b is set "1". Even when the connection to the MFP 30 for connection confirmation cannot be established, if the connection to a predetermined number or more of other MFPs 30 is established, the MFP connection flag 13b is set to "1". Therefore, even when power supply to the MFP 30 for connection confirmation is shut off, the MFP connection flag 13b can be set to "1", making it possible to suppress the wasteful continuous inhibition of outputting the protection-target information relating to the MFP 30.

Figure 6:
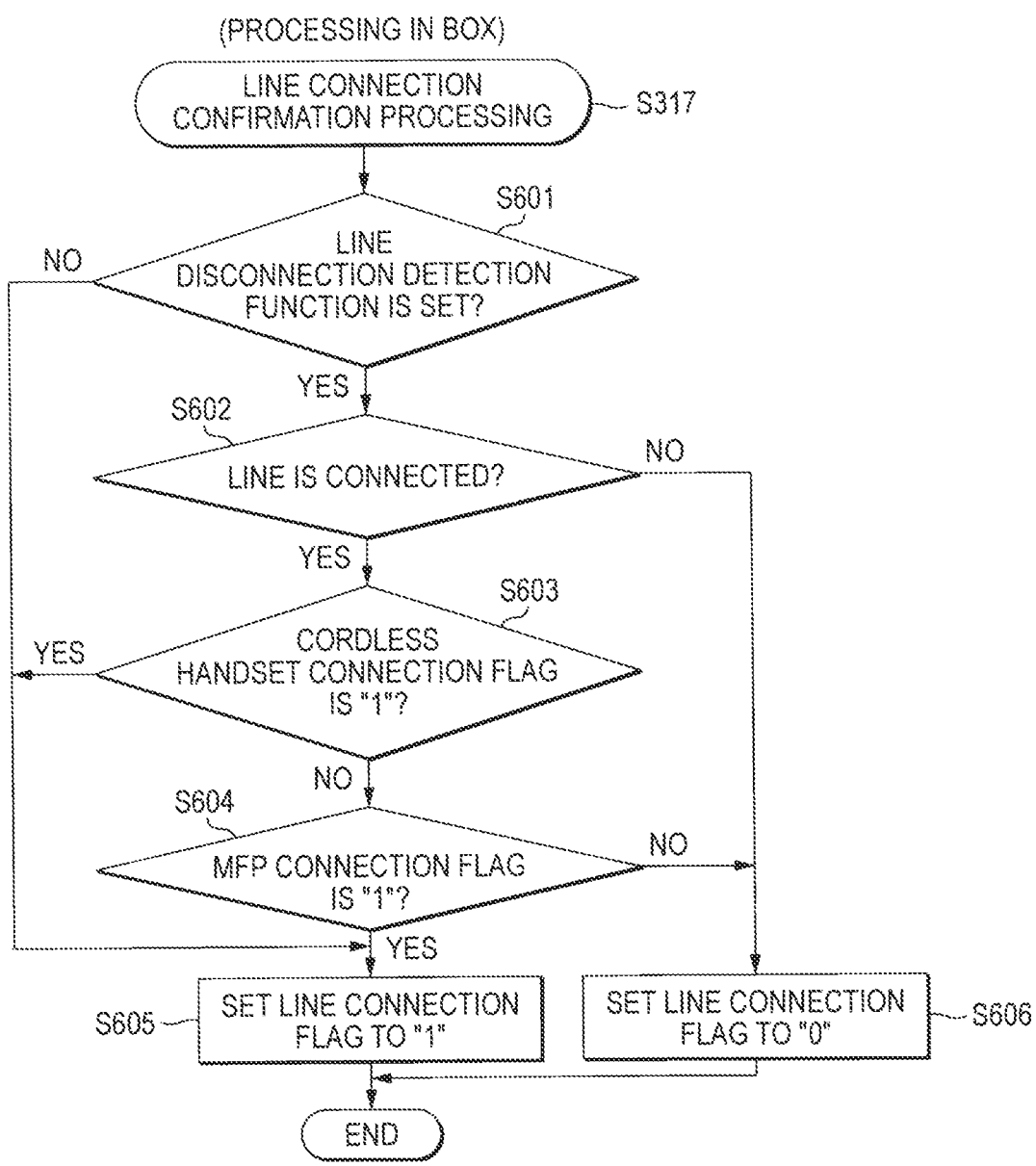
FIG. 6 is a flowchart showing line connection confirmation processing.

FIG. 6 is a flowchart showing the above-described line connection confirmation processing (S317). In the line connection confirmation processing, first, the CPU 11 determines whether or not a line disconnection detection function of the line 201 is set (S601). That is, the CPU 11 determines whether or not a line disconnection detection function (not shown) provided in the RAM 13 is set.

When the line disconnection detection function is set (S601: Yes), the CPU 11 determines whether or not the line 201 is connected to the line connection section 24 (S602). When the determination is positive (S602: Yes), the CPU 11 determines Whether or not the cordless handset connection flag 13a is "1" (S603). When t is determined in S601 that the line disconnection detection function is not set S601: No), or when the determination in S603 is positive (S603: Yes), the CPU 11 sets the line connection flag 13c to "1" (S605), and ends the line connection confirmation processing. When the determination in S603 is negative (S603: No), the CPU 11 determines whether or not the MFP connection flag 13b is "1" (S604), and when the determination is positive (S604: Yes), the CPU 11 performs the processing of S605, and ends the line connection confirmation processing.

When the determination in S604 is negative (S604: No), or when the determination in S602 is negative (when the line 201 is not connected to the line connection section 24) (S602: No), the CPU 11 sets the line connection flag 13c to "0" (S606), and ends the line connection confirmation processing.

Accordingly, according to the line connection confirmation processing, when the line 201 is disengaged from the line connection section 24, the line 201 is connected to the line connection section 24, and the connection to the MFP 30 or the cordless handset 60 satisfies a predetermined condition, such that the line connection flag 13c is set to "1".

Figure 7:
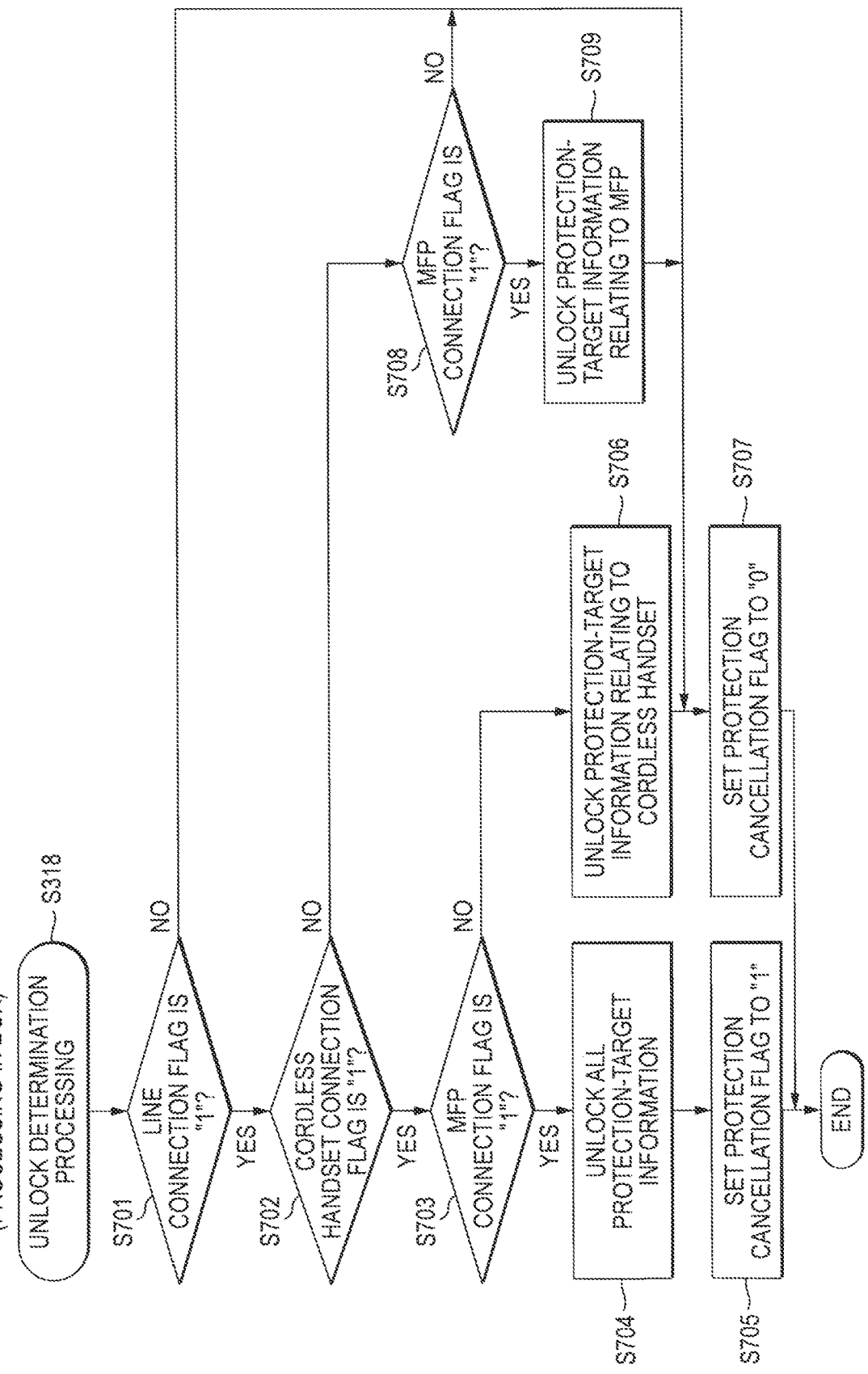
FIG. 7 is a flowchart showing unlock determination processing.

FIG. 7 is a flowchart showing the above-described unlock determination processing (S318), in the unlock determination processing, first, the CPU 11 determines whether or not the line connection flag 13c is "1" (S701). When the determination is positive (S701: Yes), the CPU 11 determines whether or not the cordless handset connection flag 13a is "1" (S702). When the determination in S702 is positive (S702: Yes), the CPU 11 determines whether or not the MFP connection flag 13b is "1" (S703).

When the determination in S703 is positive (S703: Yes), the set values of the flags 13a to 13c indicate that the line 201 is connected to the line connection section 24, and no abnormality is confirmed in the connection situation of the cordless handset 60 and the BOX 10 and in the connection situation of the MFP 30 and the BOX 10. Therefore, in this case, the CPU 11 unlocks all pieces of protection-target information (S704), sets the protection cancellation flag 13d to "1" (S705), and ends the unlock determination processing.

On the other hand, when the determination in S703 is negative (S703: No), the set values of the flags 13a to 13c indicate that the line 201 is connected to the line connection section 24, and while there is no abnormality in the connection situation of the cordless handset 60 and the BOX 10, there is abnormality in the connection situation of the MFP 30 and the BOX 10. Therefore, in this case, the CPU 11 unlocks the protection-target information (the cordless handset outgoing call history, the cordless handset incoming call history, and the cordless handset telephone directory) relating to the cordless handset 60 (S706). Next, the CPU 11 sets the protection cancellation flag 13d to "0" (S707), and ends the unlock determination processing.

When the determination in S702 is negative (S702: No), the CPU 11 determines whether or not the MFP connection flag 13h is "1" (S708). When the determination is positive (S708: Yes), the set values of the flags 13a to 13c indicate that the line 201 is connected to the line connection section 24, and while there is no abnormality in the connection situation of the MFP 30 and the BOX 10, there is abnormality in the connection situation of the cordless handset 60 and the BOX 10. Therefore, in this case, the CPU 11 unlocks the protection-target information (FAX transmission data, FAX reception data, the FAX transmission history, the FAX reception history, the FAX communication management report, and the MFP telephone directory) relating to the MFP 30 (S709), and progresses the processing to S707.

On the other hand, when the determination in S708 is negative, the set values of the flags 13a to 13c indicate that, while the line 201 is connected to the line connection section 24, there is abnormality in the connection situation of the MFP 30 and the BOX 10 and in the connection situation of the cordless handset 60 and the BOX 10. Therefore, in this case, the CPU 11 does not unlock the protection-target information, and progresses the processing to S707.

When the determination in S701 is negative, this indicates that the line 201 is not connected to the line connection section 24. Therefore, in this case, the CPU 11 does not unlock the protection-target information regardless of the connection situation of the cordless handset 60 and the BOX 10 or the connection situation of the MFP 30 and the BOX 10, and progresses the processing to S707.

According to the unlock determination processing, the protection-target information based on the combination of the set values of the cordless handset connection flag 13a, the MFP connection flag 13b, and the line connection flag 13c is unlocked. If all the flags 13a to 13c are set to "1", the protection cancellation flag 13d is set to "1". Thus, in the next processing cycle of the information protection control processing (see FIG. 3), the processing of S320 is performed, and the protection state lamp 17 is turned off. When any one of the flags 13a to 13c is set to "0", the protection cancellation flag 13d is set to "0". In this case, in the next processing cycle of the information protection control processing, the processing of S312 is performed, and the protection-target information based on the combination of the set values of the flags 13a to 13c is locked.

For example, when receiving from a communication device (the cordless handset 60 or the MFP 30) an instruction to acquire protection-target information relating to the communication device, the BOX 10 references the protection cancellation flag 13d. When the set value of the protection cancellation flag 13d is "0", a command indicating the locked state is output to the communication device as an acquisition instruction output source, and a predetermined notification (a notification by display on the LCD 67 or the LCD 39, or the like) is made in the communication device. When the value of any one of the flags 13a to 13c is "0", a command indicating the locked state may be output to the communication device as an acquisition instruction output source. In this case, when the protection-target information which is a target for the acquisition instruction output from the communication device is locked on the basis of the settings of the flags 13a to 13c, and the output thereof is inhibited. When the protection-target information which is a target for the acquisition instruction output from the communication device is unlocked on the basis of the settings of the flags 13a to 13c, the protection-target information is output to the communication device as an acquisition instruction output source.

Figure 8:
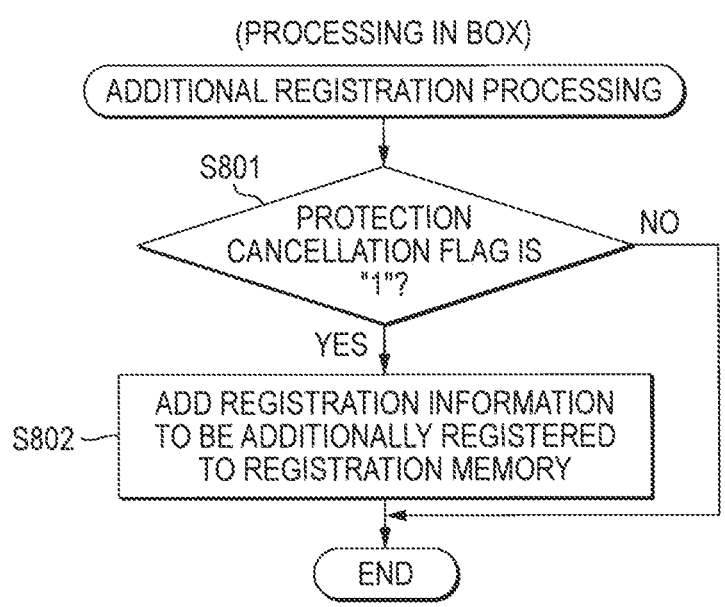
FIG. 8 is a flowchart showing additional registration processing.

FIG. 8 is a flowchart showing additional registration processing which is performed by the CPU 11 of the BOX 10. The additional registration processing is processing for adding registration information to the registration memory 14c, and is activated when a predetermined operation is input from the MFP 30 or the cordless handset 60 which wants additional registration.

In the additional registration processing, first, the CPU 11 determines whether or not the protection cancellation flag 13d is "1" (S801). When the determination is positive (S801: Yes), the CPU 11 stores registration information of the MFP 30 or the cordless handset 60 as an additional registration target in the registration memory 14c (S802), and ends the additional registration processing. On the other hand, when the determination in S801 is negative (S801: No), the processing of S802 is skipped, and the additional registration processing ends.

According to the additional registration processing, only when the protection cancellation flag 13d is "1", that is, in a safe situation in which all pieces of protection-target information are unlocked, the MFP 30 or the cordless handset 60 can be additionally registered. In other words, in a situation in which it is somewhat less than safe, the MFP 30 or the cordless handset 60 cannot be additionally registered. Therefore, it is possible to prevent the MFP 30 or the cordless handset 60 from being additionally registered and connected to the BOX 10 for the purpose of stealing the protection-target information from the BOX 10.

As described above, in the BOX 10 of this exemplary embodiment, in a situation in which the line 201 is connected to the line connection section 24, when the connection of at least one of the communication devices (MFPs 30 or cordless handsets 60) in which the connection confirmation flag 14c5 is set to "1" is established, the output of protection-target information based on the type of the communication device in which the connection is established is permitted. Therefore, it is not necessary to provide a threshold value, such as time, so as to determine the permission of outputting protection-target information, thereby appropriately protecting protection-target information without causing a problem in that protection-target information is unnecessarily output depending on the situation. There is no dependency on the user's memory or operation, such as a password input, thereby reducing a burden imposed on the user associated with protection of protection-target information. The protection-target information based on the communication device (the MFP 30 or the cordless handset 60) in which the connection is established is permitted, thereby outputting appropriate protection-target information based on a communication device in which connection is established and locking (inhibiting the output of) appropriate protection-target information based on a communication device in which connection is not established. If the line 201 is not connected to the line connection section 24, the output of protection-target information is not permitted. Therefore, even when a set of the BOX 10 and the cordless handset 60 or the MFP 30 or a set of the BOX 10, the cordless handset 60, and the MFP 30 is stolen, if the line 201 is not connected to the line connection section 24, protection-target information can remain locked, thereby protecting protection-target information more sophisticatedly.

Although the invention has been described in connection with the exemplary embodiment, the invention is not limited to the above-described exemplary embodiment, and it can be easily inferred that various improvements and modifications may be made without departing frog the spirit and scope of the invention.

For example, although in the above-described exemplary embodiment, two MFPs 30 and three cordless handsets 60 are included in the communication system 1, at least one MFP 30 or cordless handset 60 may be provided. However, from the viewpoint of the protection level of protection-target information of the BOX 10, it is preferable that there are a plurality of MFPs 30 or cordless handsets 60.

In the above-described exemplary embodiment, when the protection cancellation flag 13d is "0", the additional registration of a communication device (the MFP 30 or the cordless handset 60) is inhibited. Alternatively, even when the protection cancellation flag 13d is "0", a communication device may be additionally registered, and for a communication device added when the protection cancellation flag 13d is "0", the output of all pieces of protection-target information (including unlocked protection-target information) may be inhibited.

Although in the above-described exemplary embodiment, if there is any locked protection-target information (that is, when the protection cancellation flag 13d is "0"), the additional registration of a communication device is entirely inhibited, when the protection cancellation flag 13d is "0", it may be determined whether or not to inhibit additional registration depending on the type of a communication device to be additionally provided (for example, whether it is the cordless handset 60 or the MFP 30 or in the case of the cordless handset 60, whether or not it is a specific cordless handset).

With regard to the registration information registered into the registration memory 14c, at least the connection confirmation flag 14c5 may be non-rewritable. If the set value of the connection confirmation flag 14c5 is rewritten from "1" to "0", a risk of information leakage increases. If a configuration is made such that the connection confirmation flag 14c5 is non-rewritable, the risk can be prevented.

In the above-described exemplary embodiment, the BOX 10 and the MFP 30 are connected to each other by a wireless LAN. Alternatively, the BOX 10 and the MFP 30 be connected to each other by a wired LAN through a router.

In the above-described exemplary embodiment, in the cordless handset connection confirmation processing (see FIG. 4) and the MFP connection confirmation processing (see FIG. 5), display which requests to apply power to the MFP 30 or the cordless handset 60 for connection confirmation is performed on the LCD 39 or the LCD 67. Alternatively, the display may be performed on the LCD 16 of the BOX 10.

Although in the above-described exemplary embodiment, the connection situation of the line connection section 24 and the line 201 is the condition for locking or unlocking protection-target information, a configuration may be made such that the connection situation of the line connection section 24 and the line 201 is not the condition. That is, when the power supply connection section 25 and the commercial power supply 300 are disconnected from each other, locking is carried out regardless of the connection situation of the line connection section 24 and the line 201. A configuration may be made such that, when the establishment of connection of the BOX 10 and the MFP 30 or the cordless handset 60 satisfies a predetermined condition, unlocking based on the cordless handset 60 or the MFP 30 in which connection is established is carried out regardless of the connection situation of the line connection section 24 and the line 201.

The BOX 10 and the MFP 30 of the above-described exemplary embodiment may be respectively substituted with a personal computer (server PC) which functions as a server and a personal computer (client PC) which functions as a client. In this case, when the client PC cannot be connected to the server PC, the contents of an internal memory may be locked to be not readable.

What is claimed is:

1. A communication control device comprising:
a device connection unit configured to establish one or more connections to a plurality of communication devices, the device connection unit comprising a single physical device;
a line connection unit comprising a physical wired phone line connector and configured to be physically attached to a detachable phone line and to establish a wired phone connection to a telephone network through the phone line;
a controller configured to control communication between the plurality of communication devices connected to the communication control device by the device connection unit, and a counterpart device connected via the line connection unit through the phone line and telephone network; and
a memory for storing protection-target information including at least information on history of communication between the plurality of communication devices connected by the device connection unit and the counterpart device,
wherein the controller is configured to:
register at least one communication device connectable by the device connection unit;
determine whether the communication control device is connected to the counterpart device via the line connection unit through the phone line, the registered at least one communication device being different from the counterpart device;
determine whether the line connection unit is connected to the telephone network by determining whether the detachable phone line is physically attached to the wired phone line connector, wherein determining whether the detachable phone line is physically attached to the wired phone line connector includes detecting a voltage supplied from the phone line;

determine whether the registered at least one communication device is connected to the communication control device via the device connection unit;

when both of (a) the communication control device is determined to be connected to the counterpart device via the line connection unit through the phone line, and (b) the at least one registered communication device is determined to be connected to the communication control device via the device connection unit are satisfied:

permit, without requiring user input, an output of predefined protection-target information for one or more of the connected at least one communication device, the predefined protection-target information corresponding to information received from the counterpart device through the phone line; and transmit the predefined protection-target information to the one or more of the connected at least one communication device; and when the line connection unit is determined to not to be connected to the phone line, or when the at least one registered communication device is determined to not be connected to the communication control device via the device connection unit even when the line connection unit is determined to be connected to the phone line, inhibit output of the predefined protection-target information to the one or more of the connected at least one communication device.

2. The communication control device according to claim 1, wherein the controller is further configured to:

when all registered communication devices are determined to be not connected, determine whether or not one or more communication devices, other than the at least one registered communication device, is connected by the device connection unit;

determining a total number of the one or more communication devices, other than the at least one registered communication device, connected to the communication control device;

when the one or more communication devices other than the at least one registered communication device is determined to be connected and the total number of the one or more communication devices, other than the at least one registered communication device, connected to the communication control device is equal to or greater than a predetermined number, permit the output of predefined protection-target information for the connected one or more communication devices; and when the one or more communication devices other than the at least one registered communication device is determined to be connected and the total number of the one or more communication devices, other than the at least one registered communication device, connected to the communication control device is less than a predetermined number, inhibit the output of predefined protection-target information for the connected one or more communication devices.

3. The communication control device according to claim 1, wherein the at least one registered communication device comprises a cordless phone handset and a multi-function printing device, the multi-function printing device being separate from the cordless phone handset.

4. The communication control device according to claim 3, wherein the controller is further configured to:

when the cordless phone handset is determined to be connected, permit output of first predefined protection-target information for the cordless phone handset; and when the multi-function printing device is determined to be connected, permit output of second predefined protection-target information for the multi-function printing device, wherein the first predefined protection-target information is different from the second predefined protection-target information.

5. The communication control device according to claim 4, wherein the controller is further configured to:

when the multi-function printing device is determined to be connected and the cordless phone handset is determined to be not connected, output an instruction to cause the connected multi-function printing device to generate a predetermined display having a first message; and when the cordless phone handset is determined to be connected and the multi-function printing device is determined to be not connected, output an instruction to cause the connected cordless phone handset to generate another predetermined display having a second message different from the first message.

6. The communication control device of claim 1, wherein the protection-target information includes a cordless handset outgoing/incoming call history.

7. The communication control device of claim 1, wherein the protection-target information includes a facsimile transmission/reception history.

8. A communication system comprising:

at least one communication device; and a communication control device, wherein the communication control device comprises:

a device connection unit configured to establish one or more connections to a plurality of communication devices, the device connection unit comprising a single physical device;

a line connection unit comprising a physical wired phone line connector and configured to be physically attached to a phone line and to establish a wired phone connection to a telephone network through the phone line;

a controller configured to control communication between the plurality of communication devices, which is connected to the communication control device by the device connection unit, and a counterpart device connected via the line connection unit through the phone line and the telephone network;

a memory for storing protection-target information including at least information on history of communication between the communication devices connected by the device connection unit and the counterpart device, wherein the controller is configured to:

register at least one communication device connectable by the device connection unit;

determine whether the communication control device is connected to the counterpart device via the line connection unit through the phone line, the counterpart device being different from the registered at least one communication device;

determine whether the line connection unit is connected to the telephone network by determining whether the detachable phone line is physically attached to the wired phone line connector, wherein determining whether the detachable phone line is physically attached to the wired phone line connector includes detecting a voltage supplied from the phone line;

determine whether the registered at least one communication device is connected to the communication control device via the device connection unit;

when both (a) the communication control device is determined to be connected to the counterpart device via the line connection unit through the phone line, and (b) the at least one registered communication device is determined to be connected to the communication control device via the device connection unit are satisfied:

permit, without requiring user input, an output of predefined protection-target information for one or more of the connected at least one communication device, the predefined protection-target information corresponding to information received from the counterpart device through the phone line; and transmit the predefined protection-target information to the one or more of the connected at least one communication device; and when the line connection unit is determined to not to be connected to the phone line, or when the at least one registered communication device is determined to not be connected to the communication control device via the device connection unit even when the line connection unit is determined to be connected to the phone line, inhibit output of the protection-target information to the one or more of the connected at least one communication device.

9. The communication system of claim 8, wherein the protection-target information includes a cordless handset outgoing/incoming call history.

10. The communication system of claim 8, wherein the protection-target information includes a facsimile transmission/reception history.

11. A method for controlling output of protected information by a communication control device, the method comprising:

registering at least one communication device connectable by a device connection unit of the communication control device;

determining, based on detection by the communication control device, whether the communication control device is connected to a counterpart device via a line connection unit of the communication control device through a phone line, the counterpart device being different from the registered at least one communication device, the line connection unit comprising a wired phone line connector configured to be physically attached to a detachable phone line and to establish a wired phone connection with the counterpart device through a telephone network and via the phone line;

determining whether the line connection unit is connected to the telephone network by determining whether the detachable phone line is physically attached to the wired phone line connector, wherein determining whether the detachable phone line is physically attached to the wired phone line connector includes detecting a voltage supplied from the phone line;

determining that the registered at least one communication device is connected to the communication control device by the device connection unit;

when both of (a) the communication control device is determined to be connected to the counterpart device via the line connection unit through the phone line, and (b) the at least one registered communication device is determined to be connected to the communication control device via the device connection unit are satisfied:

permitting, without requiring user input, an output of predefined protection-target information for one or more of the connected at least one communication device, the predefined protection-target information corresponding to information received from the counterpart device through the phone line and including at least information on history of communication between communication devices connected by the device connection unit and the counterpart device; and transmitting the predefined protection-target information to the one or more of the connected at least one communication device; and when the line connection unit is determined to not to be connected to the phone line, or when the at least one registered communication device is determined to not be connected to the communication control device via the device connection unit even when the line connection unit is determined to be connected to the phone line, inhibit output of the protection-target information to the one or more of the connected at least one communication device.

12. The method of claim 11, further comprising:

after permitting the output of the predefined protection-target information, determining that the registered at least one communication device is no longer connected to the communication control device by the device connection unit; and when the at least one registered communication device is determined to not be connected, inhibiting output of the predefined protection-target information.

13. The method of claim 11, wherein the protection-target information includes a cordless handset outgoing/incoming call history.

14. The method of claim 11, wherein the protection-target information includes a facsimile transmission/reception history.

* * * * *

UNITED STATES PATENT AND TRADEMARK OFFICE
CERTIFICATE OF CORRECTION

PATENT NO. : 10,855,828 B2
APPLICATION NO. : 13/248376
DATED : December 1, 2020
INVENTOR(S) : Ryoji Yamaguchi Page 1 of 1

It is certified that error appears in the above-identified patent and that said Letters Patent is hereby corrected as shown below:

In the Claims

Column 21, Claim 1, Lines 27 and 28:
Please delete "determined to not to be connected" and insert --determined to not be connected--

Column 23, Claim 8, Lines 33 and 34:
Please delete "determined to not to be connected" and insert --determined to not be connected--

Column 24, Claim 11, Lines 35 and 36:
Please delete "determined to not to be connected" and insert --determined to not be connected--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*